(12) United States Patent
Barillot

(10) Patent No.: US 9,052,009 B2
(45) Date of Patent: Jun. 9, 2015

(54) LUBRICATION SYSTEM FOR A DIFFERENTIAL OF A DRIVEN AXLE AND AUTOMOTIVE VEHICLE COMPRISING SUCH A LUBRICATION SYSTEM

(75) Inventor: Thomas Barillot, Mornant (FR)

(73) Assignee: Renault Trucks, St. Priest (FR)

( * ) Notice: Subject to any disclaimer, the term of this patent is extended or adjusted under 35 U.S.C. 154(b) by 85 days.

(21) Appl. No.: 13/993,015

(22) PCT Filed: Dec. 30, 2010

(86) PCT No.: PCT/IB2010/003517
§ 371 (c)(1),
(2), (4) Date: Jun. 10, 2013

(87) PCT Pub. No.: WO2012/090023
PCT Pub. Date: Jul. 5, 2012

(65) Prior Publication Data
US 2013/0274054 A1    Oct. 17, 2013

(51) Int. Cl.
*F16H 57/04* (2010.01)
*F16H 48/38* (2012.01)

(52) U.S. Cl.
CPC ........ *F16H 57/0483* (2013.01); *F16H 57/0409* (2013.01); *F16H 57/0423* (2013.01); *F16H 57/0428* (2013.01); *F16H 57/045* (2013.01); *F16H 57/0471* (2013.01)

(58) Field of Classification Search
CPC ............ F16H 57/0409; F16H 57/0483; F16H 57/045; F16H 57/0471; F16H 57/0423; F16H 57/0428
USPC .......................................... 475/160, 220–253
See application file for complete search history.

(56) References Cited

U.S. PATENT DOCUMENTS

| | | | | |
|---|---|---|---|---|
| 4,429,587 | A * | 2/1984 | Finn et al. | 74/467 |
| 5,505,112 | A | 4/1996 | Gee | |
| 6,398,687 | B2 * | 6/2002 | Iwata | 475/160 |
| 7,374,507 | B2 * | 5/2008 | Corless et al. | 475/159 |
| 8,858,381 | B2 * | 10/2014 | Trost | 475/160 |
| 2010/0180721 | A1 * | 7/2010 | Quehenberger | 74/606 R |

(Continued)

FOREIGN PATENT DOCUMENTS

| | | |
|---|---|---|
| DE | 1047820 B | 12/1958 |
| DE | 1801917 A1 | 5/1970 |

(Continued)

OTHER PUBLICATIONS

International Search Report (Jul. 4, 2011) for corresponding international application No. PCT/IB2010/003517.

*Primary Examiner* — Jacob S Scott
(74) *Attorney, Agent, or Firm* — WRB-IP LLP

(57) ABSTRACT

This lubrication system for a differential of a driven axle on an automotive vehicle includes a sump in which is located a crown wheel driven by a pinion, the crown wheel being fast in rotation with a carrier, and a main lubricant tank having an inlet port and at least one outlet port. Rotation of the crown wheel causes lubricant to be transferred from the sump to the main tank via the inlet port, and the outlet port allows the lubricant to pass from the main tank to the sump. The lubrication system includes an auxiliary lubricant tank located in the sump, adapted to be filled in with lubricant by rotation of the crown wheel, and an arrangement to convey lubricant from auxiliary tank to a lubricant needing portion of the differential.

12 Claims, 6 Drawing Sheets

(56) References Cited

U.S. PATENT DOCUMENTS

2011/0192245 A1* 8/2011 Shioiri et al. .................. 74/467
2011/0212805 A1* 9/2011 Hilker et al. ................... 475/160
2012/0096968 A1* 4/2012 Kawamoto et al. ............ 74/467

FOREIGN PATENT DOCUMENTS

| DE | 102006043723 A1 | 3/2008 |
| JP | 7217725 A | 8/1995 |

* cited by examiner

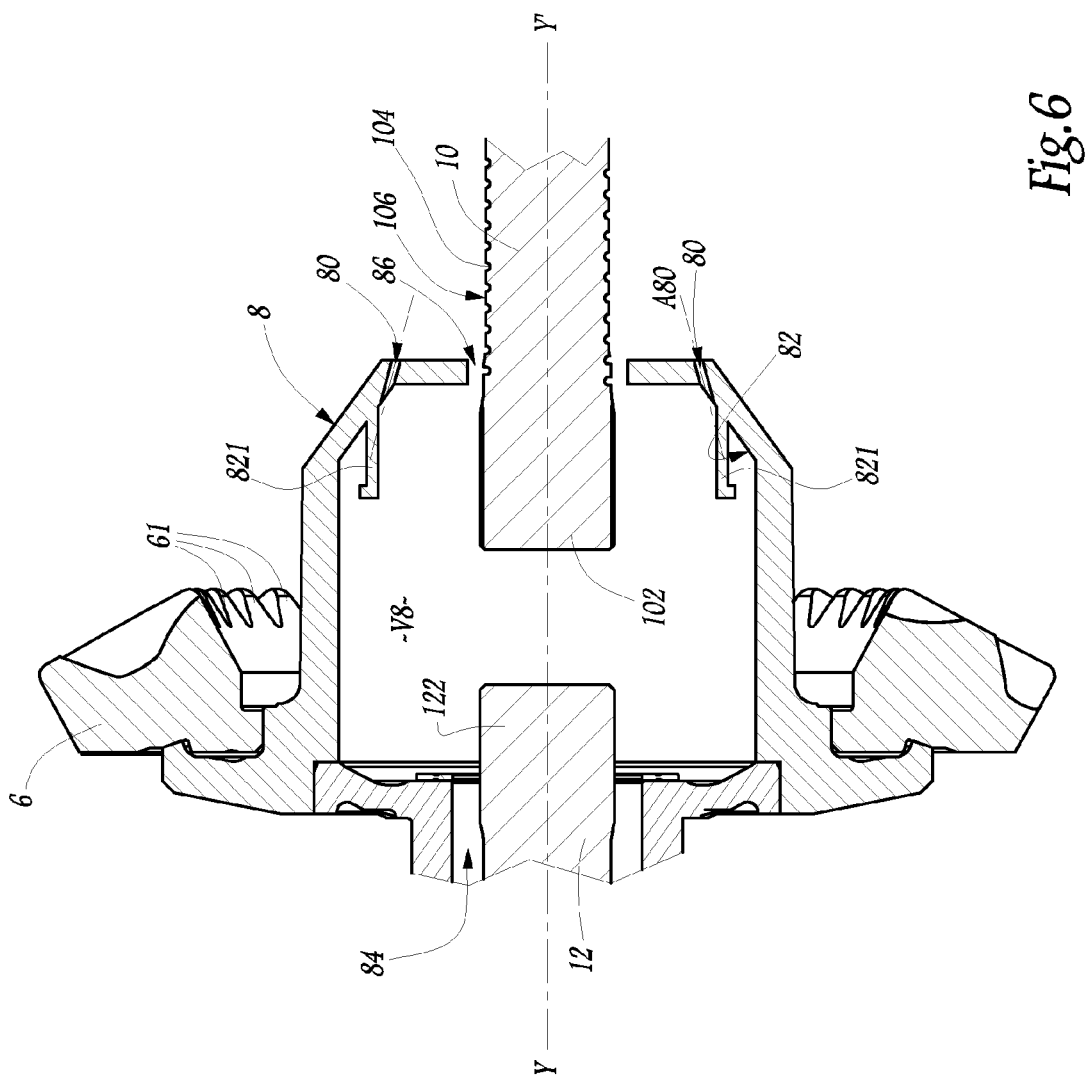

LUBRICATION SYSTEM FOR A DIFFERENTIAL OF A DRIVEN AXLE AND AUTOMOTIVE VEHICLE COMPRISING SUCH A LUBRICATION SYSTEM

BACKGROUND AND SUMMARY

The invention relates to a lubrication system for a differential of a driven axle. The invention also relates to an automotive vehicle equipped with such a lubrication system.

Automotive vehicle such as cars or trucks are generally equipped with one or several differentials on their driven axles. Differentials need lubrication in order to prevent damages such as scoring on the various elements of the differential. Differentials are commonly lubricated by splash lubrication. The differential is for example contained in an axle housing having a central part in the shape of a bulb which forms a sump partly filled with lubricant. The crown wheel, which forms the outer part of the differential, has its lower part immersed in the lubricant of the sump so that, when it rotates, it splashes the lubricant all over in the central part axle housing, thereby lubricating various parts of the differential. In case of transmission of high torques in the differential, a high level of lubrication is needed. In this case, lubricant must be provided in a large amount on various areas of the differential, in particular at the interface between gears, such as at the interface between a pinion driven by the motor of the vehicle and a crown wheel, or the various bearings which support the rotating parts of the differential. This is achieved by making sure that the right amount of lubricant is contained in the sump and splashed by the crown wheel. In case a low lubrication level is needed, for example, when low torques are to be transmitted, too high an amount of lubricant induces excessive power losses due to the resistance of the lubricant to the rotation of the crown wheel, which partially takes place in the lubricant.

To limit the power losses when low lubrication level is needed, lubrication systems known for instance from WO-A-2010/106482 use a lubricant tank arranged inside the sump containing the differential. This tank is permanently filled with lubricant by the rotation of the crown wheel, which spins the lubricant into the tank thanks to its teeth. The tank can retain a part of the lubricant which is thereby removed from the sump and removed from contact with the crown wheel. Thereby the amount of lubricant effectively involved in the lubrication is reduced, and the power losses due the crown wheel splashing the lubricant are reduced. In case of heavy duty, a high lubricant flow rate can be provided by partially emptying the tank to raise the lubricant level in the sump. The tank includes to this end electronically-controlled valves for passing the lubricant from the tank to the sump. Such a lubrication system does not provide a satisfying lubrication at the interface between the crown wheel and the pinion, in the bearings of the pinion and in the interior of the differential, because these areas are not easy to access. The lubricant does not always reach these areas. Therefore, this can lead to scoring on the elements of the differential, and to critical heating of the pinion bearings, which are located in a place which is generally above the lubricant level in the sump. Moreover, the electronic control of the transfer of lubricant from the tank to the sump is complex, expensive and not always perfectly reliable.

It is desirable to provide a new lubrication system for a differential of a driven axle on an automotive vehicle, allowing to properly lubricate critical areas of the differential and to adapt the lubrication level to the various operating configurations of the differential.

An aspect of the invention concerns a lubrication system for a differential of a driven axle on an automotive vehicle, comprising a sump in which is located a crown wheel driven by a pinion, the crown wheel being fast in rotation with a carrier, and a main lubricant tank located in the sump, having an inlet port and at least one outlet port, rotation of the crown wheel causing lubricant to be transferred from the sump to the main tank via the inlet port, and the outlet port allowing the lubricant to pass from the main tank to the sump. This lubrication system is characterized in that it comprises:

an auxiliary lubricant tank located in the sump, adapted to be filled in with lubricant by rotation of the crown wheel, and means to convey lubricant by gravity from the auxiliary tank to a lubricant needing portion of the differential.

Thanks to an aspect of the invention, the auxiliary lubricant tank is filled by the rotation of the crown wheel and allows an efficient lubrication, by gravity, of critical parts of the differential, such as the pinion bearings and/or the interior of the differential, by directly bringing the lubricant to these areas. This permits to improve the lubricant level management.

According to further aspects of the invention which are advantageous but not compulsory, such a lubrication system may incorporate one or several of the following features:

The auxiliary tank is located in the main tank, whereas lubricant is transferred to the auxiliary tank by the rotation of the crown wheel via the inlet port of the main tank.

The auxiliary tank is located in an upper area of the main tank.

The lubricant needing portion comprises one or several of an interior volume of the carrier and/or of a bearing.

The means to convey lubricant, to the interior volume of the carrier, comprise at least one pipe adapted to convey the lubricant from the auxiliary tank to an area above at least one of two wheel axles of the differential outside the carrier, whereas said wheel axle comprises a thread, realized on an outer peripheral surface of said wheel axle, and adapted to convey lubricant towards the interior of the carrier during the rotation of said wheel axle.

The means to convey lubricant, to a bearing allowing the rotation of the pinion, comprise at least one pipe adapted to convey lubricant from the auxiliary tank to an area in the vicinity of a shaft driving the pinion.

The auxiliary tank is adapted to empty itself in the main tank when it is overfilled.

The carrier comprises, on an inner surface, lubricant stopping elements adapted to prevent lubricant from getting out of the interior of the carrier.

The carrier comprises, on a surface facing the or each wheel axle, holes for allowing lubricant to get in the interior of the carrier.

The main tank is equipped with means for transferring lubricant to the sump when a rise of the lubricant level in the sump is needed.

The means for transferring lubricant from the main tank to the sump comprise at least one thermostat.

The lubrication system comprises two thermostats mounted on the main tank and adapted to open or close on the basis of the temperature of the lubricant in the sump.

The two thermostats are adapted to maintain the main tank open when the lubricant temperature in the sump is below a first temperature or above a second temperature superior to the first temperature.

The main tank is C-shaped.

An aspect of the invention also concerns an automotive vehicle comprising one or several differentials. The vehicle is characterized in that it comprises one or several above-mentioned lubrication system.

BRIEF DESCRIPTION OF THE DRAWINGS

The invention will now be explained in correspondence with the annexed figures, as an illustrative example, without restricting its scope, in the annexed figures:

FIG. 6 is a sectional view similar to the central portion of FIG. 4, showing optional aspects of the invention.

DETAILED DESCRIPTION

Figure 1:
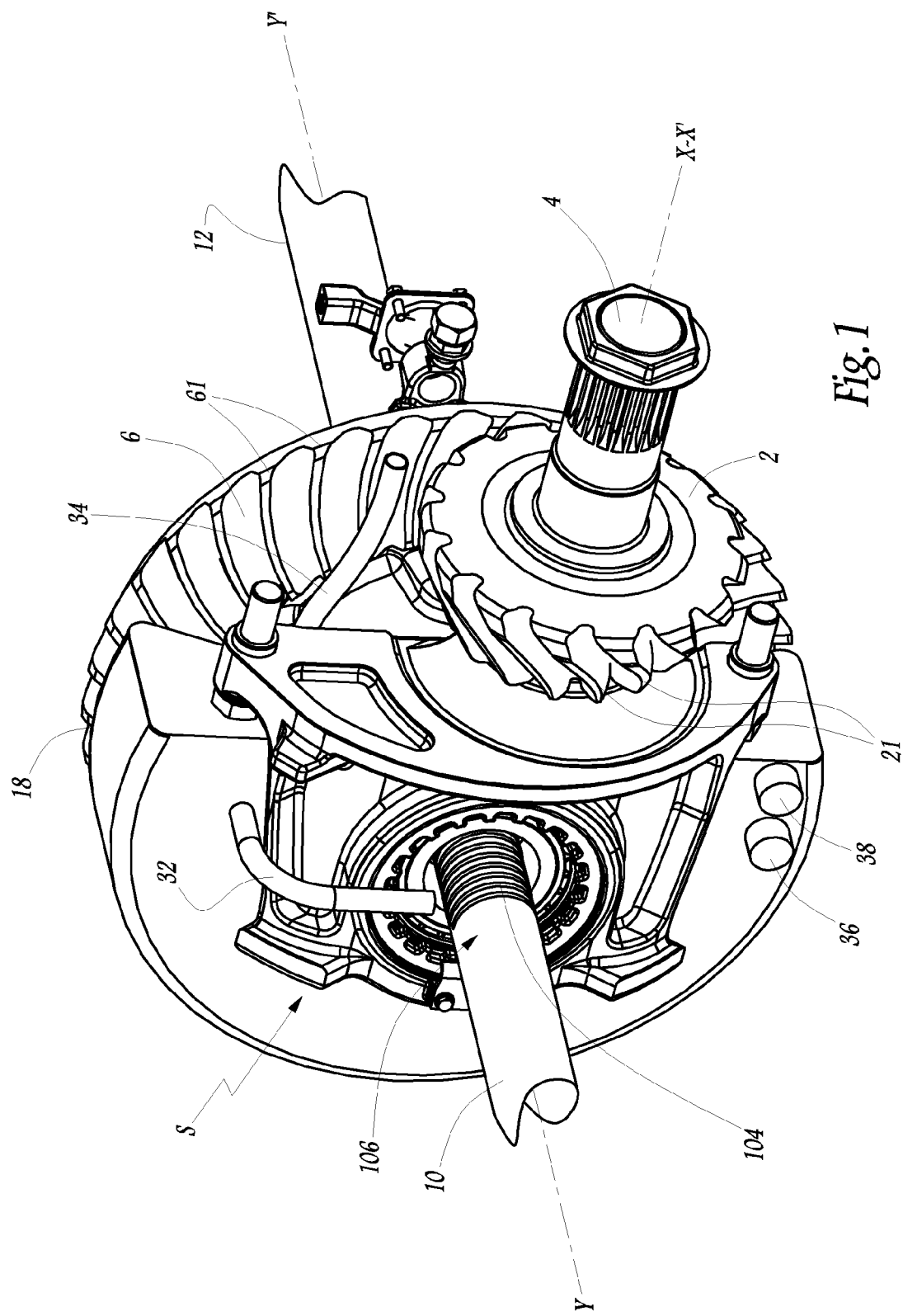
FIG. 1 is a perspective view of a lubrication system according to the invention, mounted on a differential.
Figure 2:
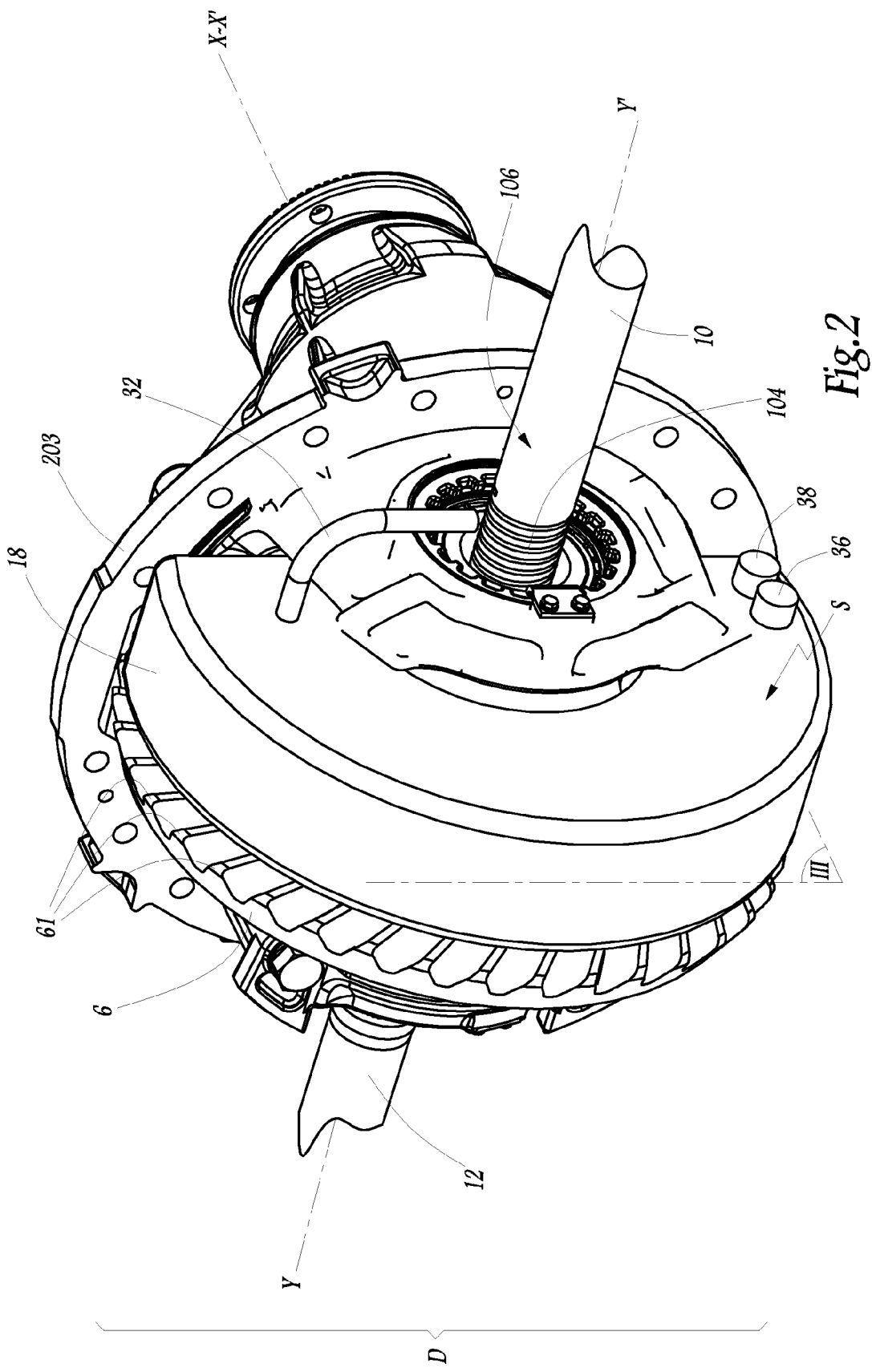
FIG. 2 is a perspective view of the lubrication system of FIG. 1 from a different angle.

The lubrication system S represented on FIGS. 1 to 6 is to be integrated in a differential D of a driven axle of an automotive vehicle, such as a truck. This differential comprises a pinion 2 connected to a drive shaft 4, which is driven by a non-shown engine of the vehicle. Pinion 2 meshes with a crown wheel 6 which is fast in rotation with a satellite carrier 8. Carrier 8 and crown wheel 6 rotate together around an axis Y-Y', while pinion 2 and drive shaft 4 rotate around an axis X-X' which is perpendicular to axis Y-Y'.

Axis Y-Y' corresponds to the rotation axis of the wheels of the vehicle which are not represented on the figures. Wheels are driven, by two wheel shafts 10 and 12 which comprise, at their ends 102 and 122 located on the side opposite to the wheels, nonrepresented gear wheels adapted to mesh with two or more non-shown satellite gears rotating with respect to carrier 8 in an interior volume V8 of carrier 8. Depending on the design of the differential, the carrier 8 defines a more or less fully enclosed volume V8, so that it may be difficult to bring lubricant inside the carrier. The mechanical operation of differential D is well known and will not be further described unless needed.

The rotation of pinion 2 around axis X-X', its interaction with crown wheel 6 and the rotation of crown wheel 6 around axis Y-Y' take place in a housing 200 made of two metallic parts 202 and 203 fixed to each other in a sealed manner and which delimit an internal volume or sump V200. These metallic parts can be part of a rigid axle housing. Sump V200 is partially filled with a lubricant fluid such as oil. This lubricant facilitates the operation of differential D. Lubrication is particularly needed at the interaction between the respective helical teeth 21 of pinion 2 and helical teeth 61 of crown wheel 6. Lubrication is also needed in a rolling bearing 14 which allows the rotation of pinion 2 around axis X-X'. Drive shaft 4 and rolling bearing 14 rotate in a bore 209 drilled in metallic part 203.

Lubrication is also needed in internal volume V8, where the gear wheels and the satellite gears interact, so as to prevent scoring on the elements of differential D.

The oil in lubrication system S can be of any type adapted to the working conditions of differential D.

Lubrication system S also comprises a main lubricant tank 18. Main tank 18 is fixed with respect to housing 200 thanks to non-shown fixing means such as bolts. Main tank 18 is globally C-shaped, when view along direction of axis Y-Y', and is substantially aligned with axis Y-Y'. Tank 18 is arranged around carrier 8 and faces the teeth 61 of the crown wheel 6. V18 denotes the internal volume of tank 18.

Tank 18 is adapted to contain lubricant oil and comprises to this end an inlet system comprising a port 182, which consists in or comprises an opening oriented towards crown wheel 6. As explained above, the lower part of the crown wheel is always immersed in the lubricant which fills the bottom pan of sump V200. During the rotation of wheel 6, several teeth 61 of the crown wheel 6 are immersed in the lubricant which fills the bottom part of sump V200. The shape of teeth 61 and their rotation with crown wheel 6 induce a turbine effect where lubricant is caught by teeth 61 in the bottom area of sump V200 and brought and splashed into the top area of sump V200 where it is spun under centrifugal force by teeth 61 into port 182 and therefore into main tank 18, as shown by arrow A1 on FIG. 4. The spun lubricant fills preferably in priority an auxiliary lubricant tank 19 located in an upper area of tank 18 in the vicinity of port 182. Auxiliary tank 19 is delimited by a partition wall 186 with respect to an outer peripheral wall 180 of main tank 18. V19 denotes the internal volume of auxiliary tank 19. In the shown embodiment, Volume V19 is a sub-volume of volume V18, located in an upper portion of volume V18.

Lubrication system S further comprises two pipes 32 and 34 originating from the bottom of auxiliary tank 19. First lubrication pipe 32 is adapted to convey lubricant by gravity from auxiliary tank 19 to an area located above wheel axle 10 inside housing 200, where pipe 32 opens downward. The path of lubricant in pipe 32 is shown by arrow A2 on FIG. 4. In the vicinity of the outlet of pipe 32, wheel axle 10 is provided with a helical thread 104 arranged on an outer peripheral surface 106 of axle 10. Lubricant falls from pipe 32 under the effect of gravity and is conveyed, as shown by arrow A3, into carrier 8 by the rotation of thread 104 around axis Y-Y'.

According to a non-shown embodiment, lubrication system S can comprise a second similar lubrication pipe adapted to convey lubricant to an area above wheel axle 12. In that case, wheel axle 12 also comprises a helical thread in order to convey lubricant into carrier 8.

Second lubrication pipe 34 is adapted to convey lubricant by gravity as shown by arrow A4, thanks to a downward slope, towards a channel 205 arranged in metallic part 203 of housing 200 in the vicinity of pinion 2. Channel 205 ends in bore 209, where lubricant is expelled from channel 205 into bore 209, as shown by arrow A5 so as to spread and lubricate bearing 14 and the interface between pinion 2 and crown wheel 6. Channel 205 can actually be made by a duct 207 inserted within a corresponding hole of part 203.

Lubrication system S works in the following way: a certain amount of lubricant is permanently present in sump V200. This amount of lubricant is distributed between main tank 18, auxiliary tank 19 and sump V200 itself. Rotation of crown wheel 6 spins lubricant into auxiliary tank 19 via port 182, under centrifugal force. Thanks to lubrication pipes 32 and 34, bearing 14 and interior volume V8 are lubricated permanently. The lubricant flow rate in pipes 32 and 34 must be inferior to the flow rate of lubricant coming into auxiliary tank 19 by the rotation of crown wheel 6. In other words, the emptying rate of auxiliary tank 19 is inferior to its filling rate by crown wheel 6. The respective geometries of items 182, 32 and 34 are adapted to this constraint.

Figure 3:
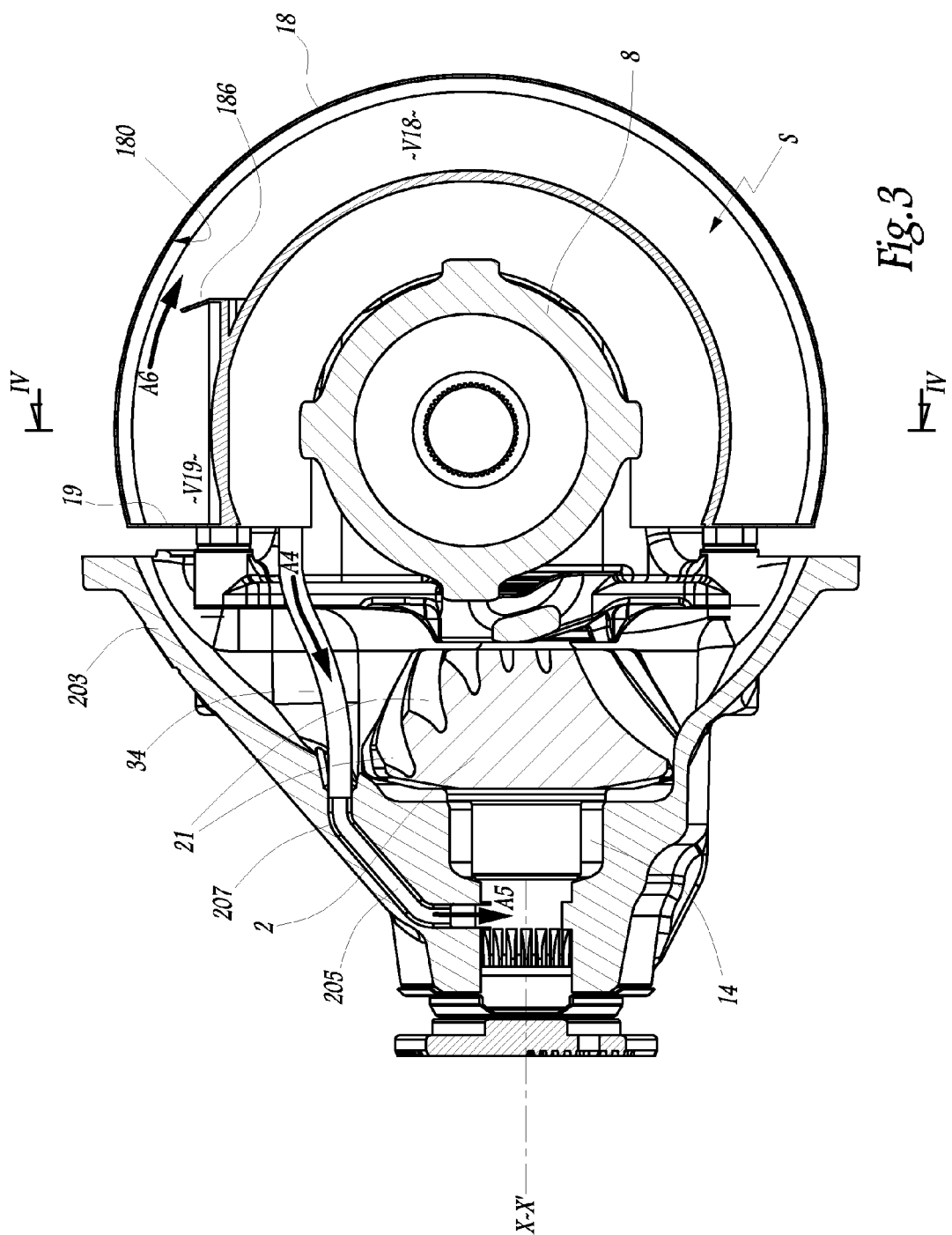
FIG. 3 is a sectional view of the lubrication system of FIGS. 1 and 2 along plane III on FIG. 2.
Figure 4:
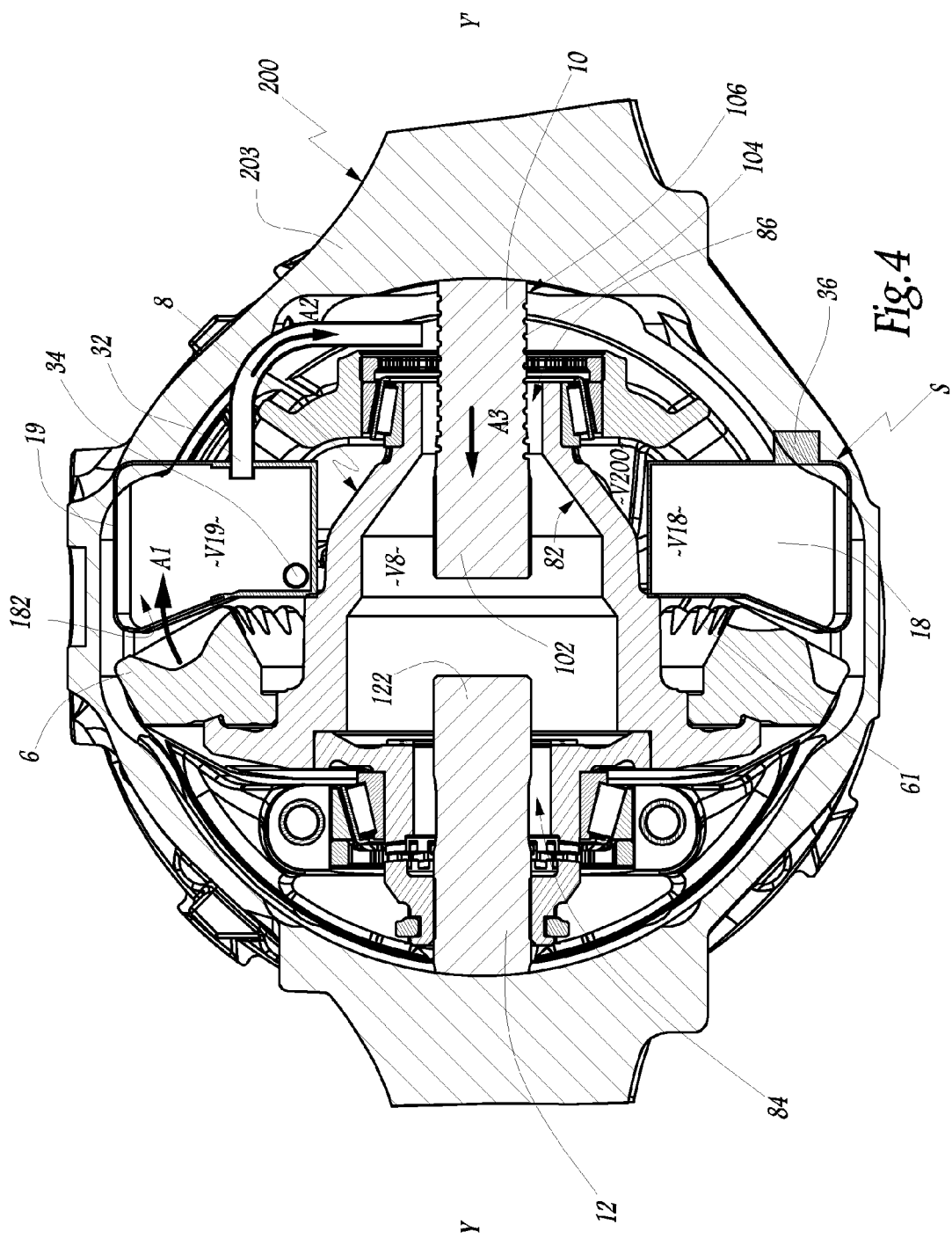
FIG. 4 is a sectional view of the lubrication system of FIGS. 1 to 3, along plane IV on FIG. 3.
Figure 5:
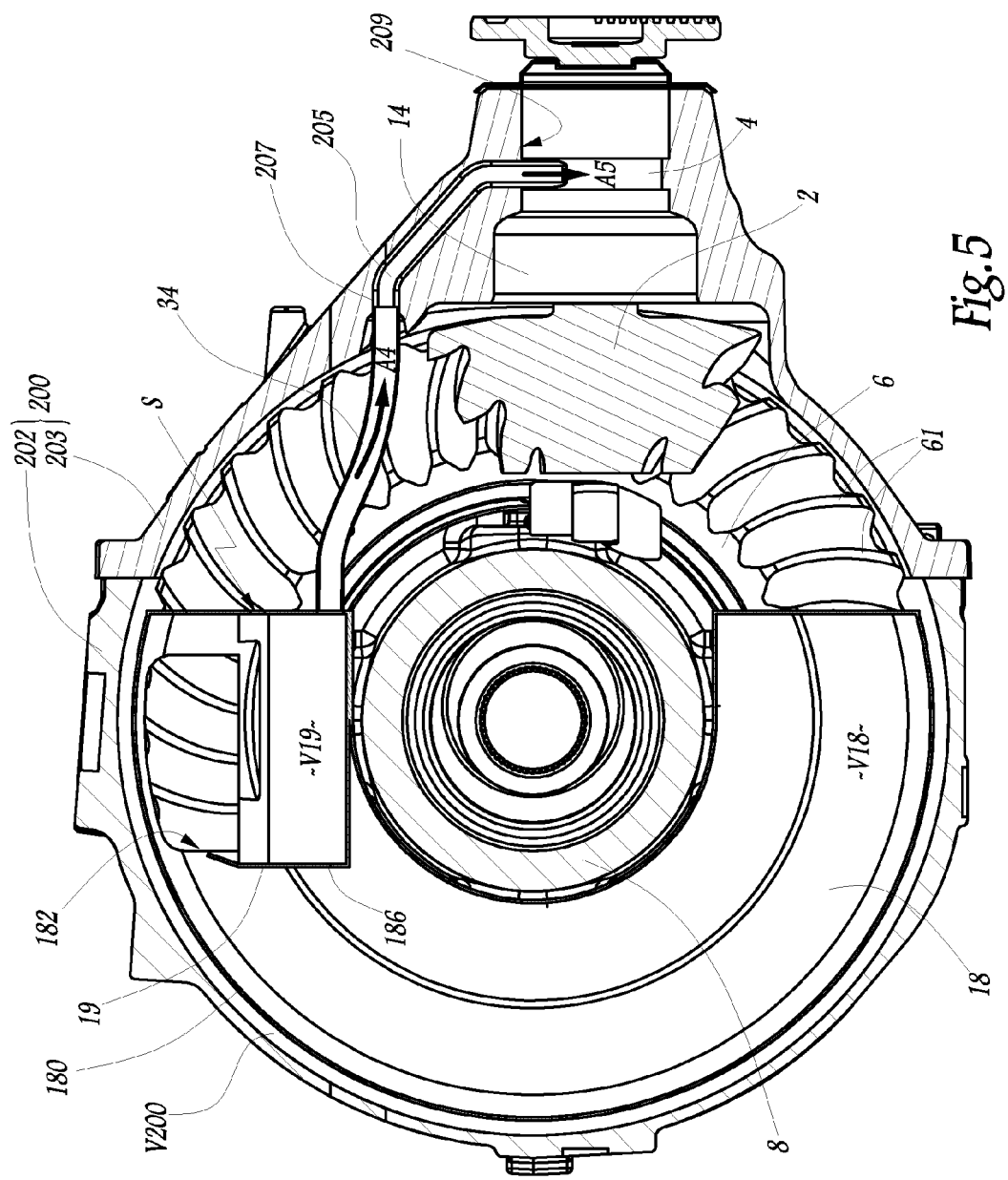
FIG. 5 is a sectional view in a plane parallel to the sectional plane of FIG. 3, in an opposite direction relative to FIG. 3.

Once lubricant overfills volume V19 of auxiliary tank 19 and its level becomes higher than partition wall 186, lubricant falls into volume V18 of main tank 18 by gravity, as shown by arrow A6 on FIG. 3. Thus, auxiliary tank 19 guarantees a constant lubrication of the interior volume V8 of carrier 8 and of the gear elements of differential D, and constantly lubricates bearing 14 and the interaction area between pinion 2 and crown wheel 6, which is generally located above the lubricant level in sump V200.

An optional aspect of the invention is represented on FIG. 6 only, with a carrier 8 having a slightly different geometry. In order to maintain the lubricant level to a high enough level in volume V8, carrier 8 comprises preferably filling holes 80 crossing its peripheral wall so as to allow passage of lubricant from sump V200 to interior volume V8. Holes 80 are preferably formed on a surface of carrier 8 in the vicinity of the outlet of lubrication pipe 32, so that lubricant spun by the rotation of wheel axle 10 may eventually get into these holes. To improve this effect, holes 80 are realized along an axis A80 diverging from axis Y-Y' towards the inside of carrier 8. Preferably, holes 80 are formed at regular intervals around axis Y-Y' so that when the vehicle is stopped and when lubricant is at its maximum level in the sump, that is to say not retained in main tank 18 or auxiliary tank 19, at least one of these holes is immersed below the oil level so that lubricant can enter the carrier 8.

According to another optional aspect of the invention represented on FIG. 6 only, the lubricant-retaining ability of carrier 8 is also improved by lubricant stopping elements 821 extending from an interior surface 82 along a direction substantially parallel to axis Y-Y'. Stopping elements 821 are preferably arranged in the vicinity of an opening 86, through which wheel axle 10 enters into carrier 8. According to a non-represented aspect of the invention, similar stopping elements may also be arranged in the vicinity of an opening 84, located at an opposite side, along axis Y-Y', of carrier 8 with respect to opening 86, and through which wheel axle 12 enters into carrier 8. Stopping elements 821 prevent a part of the lubricant filling internal volume V8 from getting out of carrier 8 by advancing towards openings 84 and 86 under, inter alia, centrifugal force. Stopping elements 821 are radially further from axis Y-Y' than holes 80.

In order to adapt the lubricant level in sump V200 to the operating conditions of the vehicle, and particularly to the torque to be transmitted to wheel axles 10 and 12, main tank 18 is equipped with two mechanical thermostats 36 and 38, such as based on a bimetal or on expandable wax, mounted in parallel and adapted to mechanically and automatically open or close when a given temperature is reached in their immediate surrounding outside main tank 18, in sump V200. Thermostats 36 and 38 are installed at the bottom of main tank 18.

First thermostat 36 is adapted to stay open at ambient temperature and to close itself at a given temperature T1. Second thermostat 38 is adapted to stay closed at ambient temperature and to open at a second given temperature T2 which is superior to T1. Thermostats 36 and 38 allow or prevent lubricant from falling by gravity from main tank 18 to sump V200.

Upon starting of the vehicle, considering auxiliary tank 19 and main tank 18 have emptied following the shutting down of the engine at the last mission of the vehicle, no lubrication by gravity is possible. The lubricant level in sump V200 must therefore be high enough to permit lubrication of the critical areas of differential D by splashing thanks to the rotation of crown wheel 6. During this starting phase, the temperature of the lubricant progressively raises, auxiliary tank 19 is progressively filled and lubrication by gravity by pipes 32 and 34 initiates. During this phase, thermostat 36 is open and thermostat 38 is closed so that the main tank 18 cannot fill-up.

When the temperature of the lubricant reaches temperature T1, the vehicle has entered a second operating phase during which torques to be transmitted are relatively low. Lubrication by splashing can therefore be reduced and the lubricant level in sump V200 be reduced accordingly. Thermostat 36 then closes and no more lubricant comes from main tank 18 to sump V200. During this phase, lubricant leakage from the differential, from pipes 32 and 34 and splash lubrication, which still occurs, but at a reduced rate, are sufficient to perform the normal lubrication of differential D. For example, temperature T1 can be comprised between 45 and 55 and preferably equals 50. In this case, the lubrication by gravity operated by auxiliary tank 19 permits to reduce the lubricant level in sump V200 and therefore to reduce the resistance of the lubricant to the rotation of crown wheel 6, without endangering the more sensitive lubricant needing portions of the differential.

In case of transmission of high torques or other causes, the lubricant temperature can reach a higher value at which it can deteriorate and loose its lubrication efficiency. This value can correspond for example to 120-140. In such a case, to reduce the overall lubricant temperature, one must bring more lubricant. This is done by the opening of thermostat 38 when temperature T2 is reached. To avoid reaching critical temperatures for the lubricant, T2 can be comprised between 110 and 120, and preferably equals 115. Main tank 18 then empties itself in sump V200 so as to reduce the lubricant temperature. Once temperature becomes again inferior to T2, thermostat 38 closes and the operation of lubrication system S goes on as in the second phase, with main tank 18 closed.

The mechanical operation of thermostats 36 and 38 is automatic and permits to avoid the use of electronic controls inside the differential. This improves the reliability of lubrication system S.

According to an alternate embodiment, a third thermostat can be mounted on main tank 18 and open itself at a temperature value higher than T2 in case of failure of one of thermostats 36 or 38.

According to another embodiment, a temperature sensor can be installed in sump V200 so as to detect a lubricant overheating and to alert the driver of the vehicle that the lubricant temperature has reached a critical value.

The vehicle comprises one or several differentials D, as it can be the case on trucks having more than one driven axle. The vehicle is therefore equipped with one or several lubrication systems S. Lubrication system S includes sump V200, main tank 18, auxiliary tank 19 pipes 32 and 34 and thermostats 36 and 38.

The invention claimed is:

1. A lubrication system for a differential of a driven axle on an automotive vehicle, comprising a sump in which is located a crown wheel driven by a pinion, the crown wheel being fast in rotation with a carrier, and a main lubricant tank, located in the sump, having an inlet port and at least one outlet port, rotation of the crown wheel causing lubricant to be transferred from the sump to the main tank via the inlet port, and the outlet port allowing the lubricant to pass from the main tank to the sump, the lubrication system comprising:
   an auxiliary lubricant tank located in the sump, adapted to be filled in with lubricant by rotation of the crown wheel, and
   at least one pipe to convey lubricant from the auxiliary tank to a lubricant needing portion of the differential,
   wherein the lubricant needing portion comprises at least one of an interior volume of the carrier and a bearing, wherein the at least one pipe to convey lubricant to the interior volume of the carrier is adapted to convey the lubricant from the auxiliary tank to an area above at least one of two wheel axles of the differential outside the carrier, and wherein the wheel axle comprises a thread, realized on an outer peripheral surface of the wheel axle, and adapted to convey lubricant towards the interior of the carrier during the rotation of the wheel axle.

2. Lubrication system according to claim 1, wherein the auxiliary tank is located in the main tank, and wherein lubricant is transferred to the auxiliary tank by the rotation of the crown wheel via the inlet port of the main tank.

3. Lubrication system according to claim 2, wherein the auxiliary tank is located in an upper area of the main tank.

4. Lubrication system according to claim 1, wherein the at least one pipe to convey lubricant, to a bearing allowing the rotation of the pinion, is adapted to convey lubricant from the auxiliary tank to an area in the vicinity of a shaft driving the pinion.

5. Lubrication system according to claim 1, wherein the auxiliary tank comprises a partition wall lower than other lateral walls of the auxiliary tank and above which the lubricant can flow when the auxiliary tank is overfilled.

6. Lubrication system according to claim 1, wherein the carrier comprises, on an inner surface, lubricant stopping elements adapted to prevent lubricant from getting out of the interior of the carrier.

7. Lubrication system according to claim 1, wherein the carrier comprises, on a surface facing the wheel axle, holes for allowing lubricant to get in the interior of the carrier.

8. Lubrication system according to claim 1, wherein the main tank is equipped with at least one thermostat for transferring lubricant to the sump when a rise of the lubricant level in the sump is needed.

9. Lubrication system according to claim 8, comprising two thermostats mounted on the main tank and adapted to open or close on the basis of the temperature of the lubricant in the sump.

10. Lubrication system according to claim 9, wherein the two thermostats are adapted to maintain the main tank open when the lubricant temperature in the sump is below a first temperature or above a second temperature superior to the first temperature.

11. Lubrication system according to claim 1, wherein the main tank is C-shaped.

12. Automotive vehicle comprising one or several differentials, comprising one or several lubrication systems according to claim 1.

* * * * *